United States Patent
Couturier et al.

(10) Patent No.: US 10,819,730 B2
(45) Date of Patent: Oct. 27, 2020

(54) AUTOMATIC USER SESSION PROFILING SYSTEM FOR DETECTING MALICIOUS INTENT

(71) Applicant: International Business Machines Corporation, Armonk, NY (US)

(72) Inventors: Russell L. Couturier, Worcester, MA (US); Michael Hanner, Kanata (CA); Iosif V. Onut, Ottawa (CA); Ronald B. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 15/832,164

(22) Filed: Dec. 5, 2017

(65) Prior Publication Data

US 2019/0173908 A1  Jun. 6, 2019

(51) Int. Cl.
*H04L 29/06* (2006.01)

(52) U.S. Cl.
CPC ...... *H04L 63/1433* (2013.01); *H04L 63/1425* (2013.01); *H04L 63/1416* (2013.01)

(58) Field of Classification Search
CPC ............. H04L 63/1433; H04L 63/1425; H04L 63/1416

See application file for complete search history.

(56) References Cited

U.S. PATENT DOCUMENTS

| | | | | |
|---|---|---|---|---|
| 7,376,969 B1 * | 5/2008 | Njemanze | ................ | G06F 21/55 709/224 |
| 8,079,083 B1 * | 12/2011 | Bennett | ............... | H04L 63/1416 726/23 |
| 8,850,583 B1 * | 9/2014 | Nelson | ................ | H04L 63/1433 380/44 |
| 9,225,736 B1 | 12/2015 | Roundy et al. | | |
| 9,479,523 B2 | 10/2016 | Altman et al. | | |
| 9,516,053 B1 * | 12/2016 | Muddu | ................... | H04L 43/08 |
| 2013/0081141 A1 * | 3/2013 | Anurag | ................... | G06F 21/55 726/23 |
| 2013/0097706 A1 * | 4/2013 | Titonis | ................. | H04W 12/12 726/24 |
| 2014/0157405 A1 | 6/2014 | Joll et al. | | |
| 2016/0217187 A1 | 7/2016 | Iesiev et al. | | |
| 2017/0024566 A1 | 1/2017 | Kuykendall et al. | | |
| 2017/0264626 A1 * | 9/2017 | Xu | ....................... | H04L 63/1425 |
| 2017/0302685 A1 * | 10/2017 | Ladnai | ................ | H04L 63/1416 |

(Continued)

OTHER PUBLICATIONS

Lawal et al., "Analysis and Evaluation of Network-Based Intrusion Detection and Prevention System in an Enterprise Network Using Snort Freeware," African Journal of Computing & ICT, vol. 6., No. 2, Jun. 2013, 16 pages.

(Continued)

*Primary Examiner* — Saleh Najjar
*Assistant Examiner* — Devin E Almeida
(74) *Attorney, Agent, or Firm* — Yee & Associates, P.C.

(57) ABSTRACT

A method for analyzing past user sessions for malicious intent. A security incident is detected by a computer system. Responsive to detecting the security incident, a forensic investigation is triggered by the computer system using a set of security rules for detecting website vulnerability in which the set of security rules is applied to a set of past user sessions, wherein the set of security rules is for a dynamic analysis product.

18 Claims, 4 Drawing Sheets

(56) References Cited

U.S. PATENT DOCUMENTS

2018/0077187 A1* 3/2018 Garman .............. H04L 63/1425
2019/0124114 A1* 4/2019 Purushothaman ...... H04L 43/04

OTHER PUBLICATIONS

Alotibi et al., "Behavioral-Based Feature Abstraction from Network Traffic," ResearchGate, Conference paper, Mar. 2015, 10 pages. https://www.researchgate.net/profile/Gaseb_Alotibi/publication/275099769_Behavioral-Based_Feature_Abstraction_from_Network_Traffic/links/5532c30f0c127acb0ded9f95.pdf.

"Application security testing and risk management," IBM Security AppScan Enterprise, IBM Software, Application security, Jun. 2012, copyright 2012, 8 pages. http://www.sebyde.nl/wp-content/uploads/2013/12/Data-sheet-appscan-enterprise.pdf.

* cited by examiner

AUTOMATIC USER SESSION PROFILING SYSTEM FOR DETECTING MALICIOUS INTENT

BACKGROUND

1. Field

The disclosure relates generally to an improved computer system and, more specifically, to analyzing user sessions for malicious intent.

2. Description of the Related Art

Malicious actions by users are a constant concern for websites, web services, or other web-related resources on computers or other hardware accessed through the Internet. Security threats may occur from hackers or other users who seek to exploit weaknesses in a website, web service, or other web-related resources. These attacks may occur by taking advantage of various security exploits in the targets. Attacks may include, for example, password guessing, password cracking, analyzing packets, spoofing attacks, computer viruses, or other techniques.

Malicious actions by users can be detected in a number of different ways. For example, intrusion detection systems can be used to monitor a network or computers for malicious activity or policy violations. Detections of actions that indicate the occurrence of malicious activity or policy violations can be reported to an administrator or collected centrally using a security information and event management system. A security information and event management system can receive reports from different sources and employ different filtering techniques to distinguish malicious activity from false alarms.

These types of systems use various techniques to detect intrusions. For example, signature-based detection, anomaly-based detection, and other types of detection techniques can be used. These types of detection techniques are performed in real-time to quickly identify potential or actual intrusions. Additionally, virus scanners and other types of intrusion protection systems can be used on computers and other network devices as a preemptive approach to network security to identify potential threats and respond to those threats.

SUMMARY

According to one embodiment of the present invention, a method for analyzing past user sessions for malicious intent is present. A security incident is detected by a computer system. Responsive to detecting the security incident, a forensic investigation is triggered by the computer system using a set of security rules for detecting web site vulnerability in which the set of security rules is applied to a set of past user sessions, wherein the set of security rules is for a dynamic analysis product.

According to another embodiment of the present invention, a computer system comprising a processor unit and a forensic analysis product running on the processor unit is present. The forensic analysis product, responsive to detecting a security incident, triggers a forensic investigation using a set of security rules for detecting web site vulnerability in which the set of security rules is applied to a set of past user sessions, wherein the set of security rules is for a dynamic analysis product.

According to yet another embodiment of the present invention, a computer program product for analyzing user sessions for malicious intent comprising a computer-readable storage media, first program code, and second program code is present. The first program code, stored on the computer-readable storage media, detects a security incident. The second program code, stored on the computer-readable storage media, triggers a forensic investigation using a set of security rules for detecting web site vulnerability in response to detecting the security incident, in which the set of security rules is applied to a set of past user sessions, wherein the set of security rules is for a dynamic analysis product.

DETAILED DESCRIPTION

Figure 1:
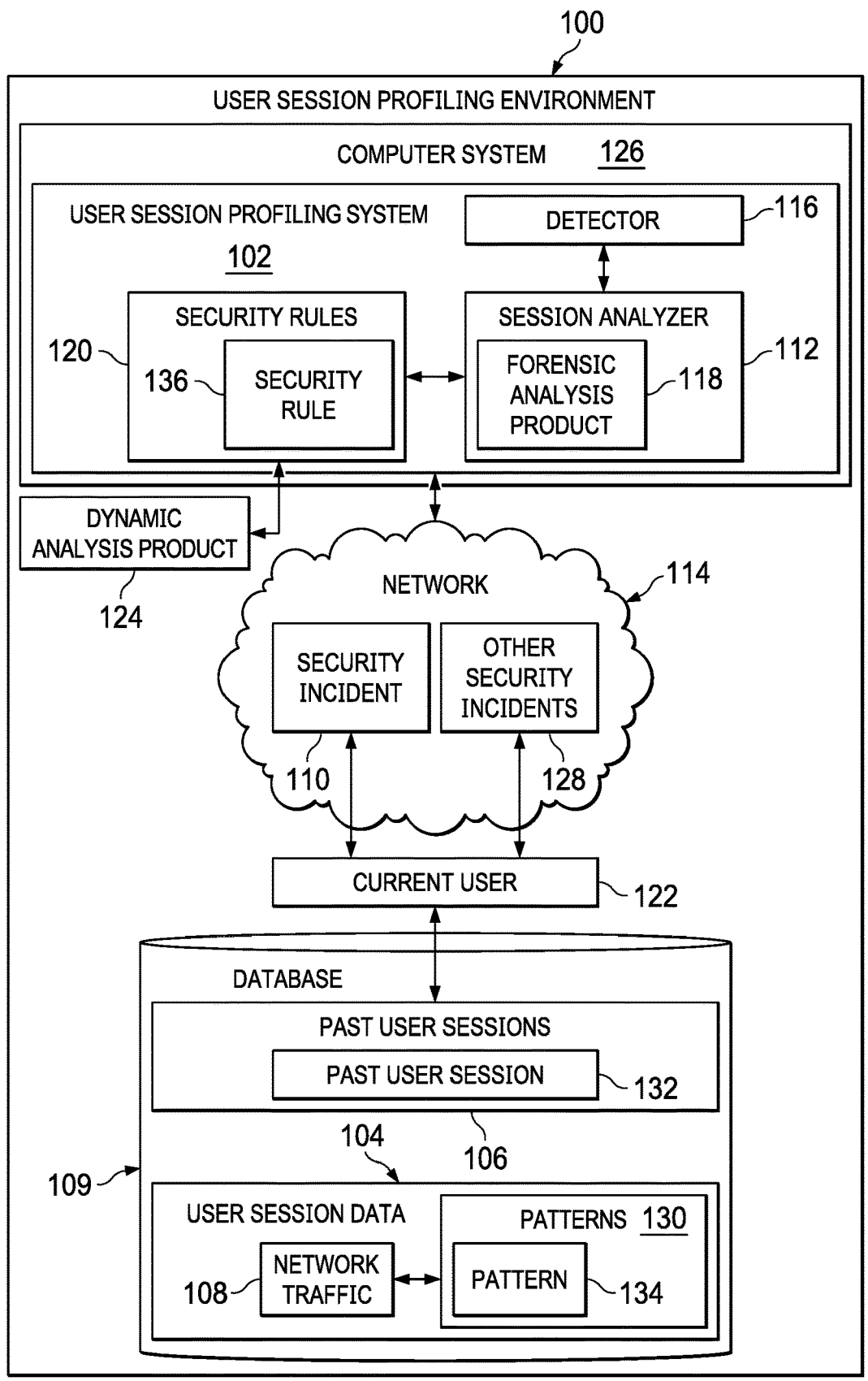
FIG. 1 is a block diagram of a user session profiling environment in accordance with an illustrative embodiment.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that it would be desirable to have a method, apparatus, computer system, and computer program product that can detect malicious actions that may be missed by a detection system such as intrusion protection systems, intrusion detection systems, and security information and event management systems. The illustrative embodiments recognize and take into account that with these types of systems, detection is performed in real-time.

With this type of processing, these systems typically do not have time to perform an in-depth analysis of actions. When real-time detection is performed, the number of attack signatures that can be managed to provide real time detection is also limited.

The illustrative embodiments recognize and take into account that application security testing is currently performed for websites or other web-related resources. The illustrative embodiments recognize and take into account that this type of testing is currently performed utilizing dynamic analysis of products in an isolated preproduction environment in which these products can simulate a hacker attempting to break into a web resource. This type of testing uses a set of rules to form tests that use traffic mutations to break into a website or some other web-related resource that is being tested. The illustrative embodiments recognize and take into account that the tests performed by a dynamic analysis product can be applied to data regarding network traffic selected for forensic analysis by forensic analysis product.

With reference now to the figures and, in particular, with reference to FIG. 1, a block diagram of a user session profiling environment is depicted in accordance with an illustrative embodiment. In this illustrative example, user session profiling environment 100 is an environment in which automatic profiling of user sessions can be performed to identify malicious intent in the user sessions.

As depicted, user session profiling system 102 can be used to analyze user session data 104 for past user sessions 106. Past user sessions 106 are user sessions that have already occurred. As depicted, user session data 104 comprises network traffic 108. Network traffic 108 includes data packets that can contain at least one of requests, hypertext transfer protocol (HTTP), cookies, or other types of information. In this example, past user sessions 106 can be stored in database 109.

In this illustrative example, session analyzer 112 in user session profiling system 102 is located in computer system 126. Database 109 also can be located in computer system 126. Computer system 126 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system. Session analyzer 112 is configured to detect security incident 110. As depicted, security incident 110 is an event that can indicate that at least one of a computer, a server, a network device, data, a router, a website, a web service, or other web-related resource has been compromised.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

These components can be located in network 114. Security incident 110 also can indicate that protective measures for these components have failed. Network 114 can take a number of different forms. For example, network 114 can be selected from at least one of a local area network (LAN), a wide area network (WAN), a virtual private network (VPN), an intranet, the Internet, a metropolitan area network (MAN), or other suitable types of networks.

As depicted, user session profiling system 102 is in communication with network 114. In some illustrative examples, computer system 126 in which user session profiling system 102 is located can be considered part of network 114.

In this depicted example, the detection of security incident 110 can occur utilizing detector 116 in user session profiling system 102. As depicted, detector 116 can be used to trigger analysis of one or more of past user sessions 106. Detector 116 can take a number of different forms. For example, the detecting can be performed by detector 116 can be selected from at least one of intrusion protection system (IPS), intrusion detection system (IDS), or a security information and event management (SIEM) system.

Responsive to detecting security incident 110, forensic analysis product 118 in session analyzer 112 triggers a forensic investigation using a set of security rules 120 for detecting web site vulnerability. As used herein, "a set of," when used with reference to items, means one or more items. For example, "a set of security rules 120" is one or more of security rules 120.

In this illustrative example, forensic analysis product 118 applies the set of security rules 120 to a set of past user sessions 106 to perform a forensic analysis. For example, applying security rules 120 can include comparing patterns of network traffic 108 in one or more past user sessions 106 for current user 122 against security rules 120 to determine whether malicious activity exists in the patterns of network traffic 108.

In the illustrative example, security rules 120 may include rules that can be useful for performing a forensic analysis. For example, Rule X in security rules 120 can be a rule that is configured to detect structured query language (SQL) injection. This example rule may be applied to a situation in which a webpage asks for username and password. The rule may detect when "or" "=" is submitted instead of submitting the username and password to the server. The rule may then examine the response from the server and detect if the server is compromised. This situation is an example of a mutation.

With this type of role in security rules 120, forensic analysis product 118 can use the rule to analyze network traffic from past user sessions 106. Forensic analysis product 118 can identify cookies and parameters in the network traffic and examine the values for these items. If the values for these items are similar or match the values that dynamic analysis product 124 would use, then forensic analysis product 118 examines the response from the server in the network traffic from past user sessions 106 following the same logic that dynamic analysis product 124 would employ to detect vulnerabilities. In this case, the analysis performed by forensic analysis product 118 can determine whether the attack was successful in compromising the server. In either case, the presence of traffic mutations in the network traffic from past user sessions 106 indicates the presence of an intruder when utilized by forensic analysis product 118.

A forensic analysis is an analysis performed after a period of activity has been completed. In this example, the period of activity is for past user session 132. The set of past user sessions 106 can be for current user 122 or one or more other users in addition to or in place of current user 122. As depicted, the set of security rules 120 is for dynamic analysis product 124. Dynamic analysis product 124 made be, for example, IBM Security AppScan, or other similar products.

The set of security rules 120 can also be utilized by forensic analysis product 118. For example, forensic analysis product 118 identifies a set of past user sessions 106 for current user 122 as identified in security incident 110. Forensic analysis product 118 then applies the set of security rules 120 for dynamic analysis product 124 to the set of past user sessions 106 for current user 122 to identify other security incidents 128 associated with current user 122.

Forensic analysis product 118 can take a number of different forms. For example, forensic analysis product 118 can be IBM Security QRadar Incident Forensics or some other suitable forensic analysis product.

Security rules 120 defines the pattern of network traffic 108 that can be considered as activity having malicious intent. For example, the pattern of network traffic 108 may include requests and responses in a particular order. Dynamic analysis product 124 utilizes security rules 120 to perform tests. Forensic analysis product 118 utilizes security rules 120 to identify patterns 130 of network traffic 108 that can be considered malicious actions on the part of a user.

As depicted, dynamic analysis product 124 is configured to detect website vulnerability utilizing security rules 120.

Dynamic analysis product 124 is configured to perform a test on a website to detect web site vulnerability utilizing security rules 120. Forensic analysis product 118 utilizes security rules 120 to identify patterns 130 of network traffic 108 that can be considered malicious actions on the part of a user. This analysis is a different use of security rules 120 as compared to dynamic analysis product 124.

In this depicted example, dynamic analysis product 124 and forensic analysis product 118 are configured to communicate with each other such that forensic analysis product 118 is able to download or receive security rules 120 for use in analyzing past user sessions 106. For example, forensic analysis product 118 can include a database of security rules 120 with dynamic analysis product 124 that is utilized by forensic analysis product 118 to perform the forensic investigation. In another example, security rules 120 can be received from another source. For example, the source may be a source that supplies security rules 120 to dynamic analysis product 124.

In one illustrative example, the set of security rules 120 are applied to past user sessions 106 by applying the set of security rules 120 to patterns 130 of network traffic 108 for the set of past user sessions 106 for current user 122 to identify the group of other security incidents 128 associated with current user 122. In another illustrative example, set of security rules 120 is applied to the set of past user sessions 106 to identify the group of other security incidents 128 by applying the set of security rules 120 to patterns 130 of network traffic 108 for past user session 132 in past user sessions 106 for current user 122 to determine whether pattern 134 of network traffic 108 in patterns 130 of network traffic 108 matches security rule 136 in the set of security rules 120 to identify the group of other security incidents 128 associated with current user 122. As used herein, "a group of," when used with reference to items, means one or more items. For example, "a group of other security incidents 128" is one or more of other security incidents 128.

In the illustrative example, user session profiling system 102 may be implemented in software, hardware, firmware, or a combination thereof. When software is used, the operations performed by user session profiling system 102 may be implemented in program code configured to run on hardware, such as a processor unit. When firmware is used, the operations performed by user session profiling system 102 may be implemented in program code and data and stored in persistent memory to run on a processor unit. When hardware is employed, the hardware may include circuits that operate to perform the operations in user session profiling system 102.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components. For example, the processes may be implemented as circuits in organic semiconductors.

In one illustrative example, one or more technical solutions are present that overcome a technical problem with detecting malicious intent by users. As a result, one or more technical solutions may provide a technical effect of enabling a forensics analysis product to detect malicious actions that may be missed by systems such as an intrusion detection system, an intrusion protection system, a security information and event management system, or other types of systems.

With off-line processing in one illustrative example, a set of security rules used in a dynamic analysis product can be applied to data from past user sessions. Malicious actions that may have been missed by systems that perform detection in real-time can be detected by a forensic analysis product using the set of security rules. With this type of processing, an entire database of security hacks set out in the set of security rules typically used in dynamic analysis can be used in the forensic analysis of past user sessions.

Further, this analysis can be triggered based on recorded patterns of network traffic. Although any number of security intrusions, may have already happened, this information can be valuable for use in preventing future intrusions. For example, the detection of the security can be used by at least one of an intrusion protection system (IPS), an intrusion detection system (IDS), or a security information and event management system (SIEM).

In the illustrative example, when a security incident is detected by a scanner such as intrusion detection system, intrusion detection system, or a security information and event management system, a forensic analysis can be triggered to identify types of actions that the user may have attempted. These actions may include probing or looking for vulnerabilities, discovering information about the target, exploiting vulnerabilities any target, or other malicious actions.

As a result, computer system 126 operates as a special purpose computer system in which forensic analysis product 118 in computer system 126 enables detecting one or more security incidents in past user sessions 106. In particular, forensic analysis product 118 transforms computer system 126 into a special purpose computer system as compared to currently available general computer systems that do not have forensic analysis product 118 configured to utilize a set of security rules 120.

The illustration of user session profiling environment 100 and the different components in this environment in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In yet another illustrative example, the set of security rules 120 may be located with dynamic analysis product 124. With this type of implementation, forensic analysis product 118 can communicate with dynamic analysis product 124 to determine whether any of patterns 130 of network traffic 108 indicate malicious activity by current user 122. For example, forensic analysis product 118 can send requests or other types of network traffic 108 to dynamic analysis product 124 to determine whether network traffic 108 meets a security rule in security rules 120 for dynamic analysis product 124. In other words, forensic analysis product 118 and dynamic analysis product 124 can be configured to communicate with each other such that dynamic analysis product 124 performs checking of network traffic 108 utilizing security rules 120 under the direction of forensic analysis product 118.

In another illustrative example, forensic analysis product 118 can be configured to select a subset of security rules 120 based on the entity being tested (parameter, cookies) based on the structure of the hypertext markup language (HTML) page and other factors. This type of processing can be performed in addition to utilizing all of security rules 120 for analyzing past user sessions 106.

In still another illustrative example, forensic analysis product 118 may be components in a larger product or in a suite of products. For example, forensic analysis product 118 can be part of a security information and event management system.

Figure 2:
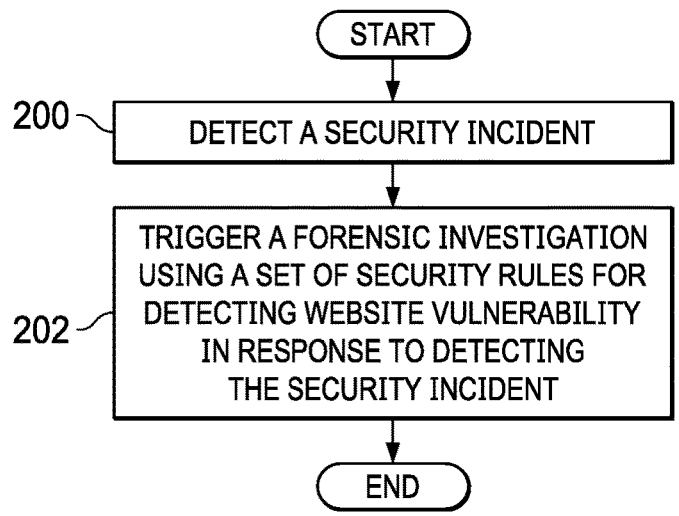
FIG. 2 is a flowchart of a process for analyzing past user sessions for malicious intent in accordance with an illustrative embodiment.

Turning next to FIG. 2, a flowchart of a process for analyzing past user sessions for malicious intent is depicted in accordance with an illustrative embodiment. The process depicted in FIG. 2 can be implemented in forensic analysis product 118 to analyze user sessions for patterns of activity that indicate malicious intent may be present. As depicted, forensic analysis product 118 can be implemented in software, hardware, or a combination thereof. This component is located in a computer system in the depicted examples.

The process begins by detecting a security incident (step 200). The detection can occur using at least one of an intrusion protection system, an intrusion detection system, or a security information and event management system. For example, these components can send a message, an indication, an alert, or some other communication to forensic analysis product 118 that indicates that a security incident has occurred. In this illustrative example, the security event occurs with respect to a user session for the current user. The process triggers a forensic investigation using a set of security rules for detecting web site vulnerability in response to detecting the security incident (step 202). The process terminates thereafter.

In step 202, a set of security rules is applied to a set of past user sessions. The set of past user sessions may be for the current user of a user session in which a security incident is detected. In other illustrative examples, the set of past user sessions may be any number of users.

In the depicted example, the set of security rules selected are for a dynamic analysis product to perform security tests to detect website vulnerability. These security rules are utilized by the process to perform the forensic analysis on past user sessions. The forensic investigation can be performed at any time after the detection of the security incident. For example, the forensic investigation can begin substantially immediately upon detecting the security incident. In another illustrative example, the forensic investigation can begin minutes, hours, days, or some other period of time after detecting the security incident.

In this manner, the process can determine whether current user 122 identified for security incident 110 performed other malicious activities in network 114. Thus, user session profiling system 102 can determine whether additional damage or other issues may have occurred within network 114 in addition to security incidents 110. For example, this analysis can be utilized to determine whether current user 122 has hacked or infiltrated one or more data processing systems within network 114 into a system. This system also provides the capability to determine whether current user 122 has ex-filtrated data, or any other undesirable activities.

Figure 3:
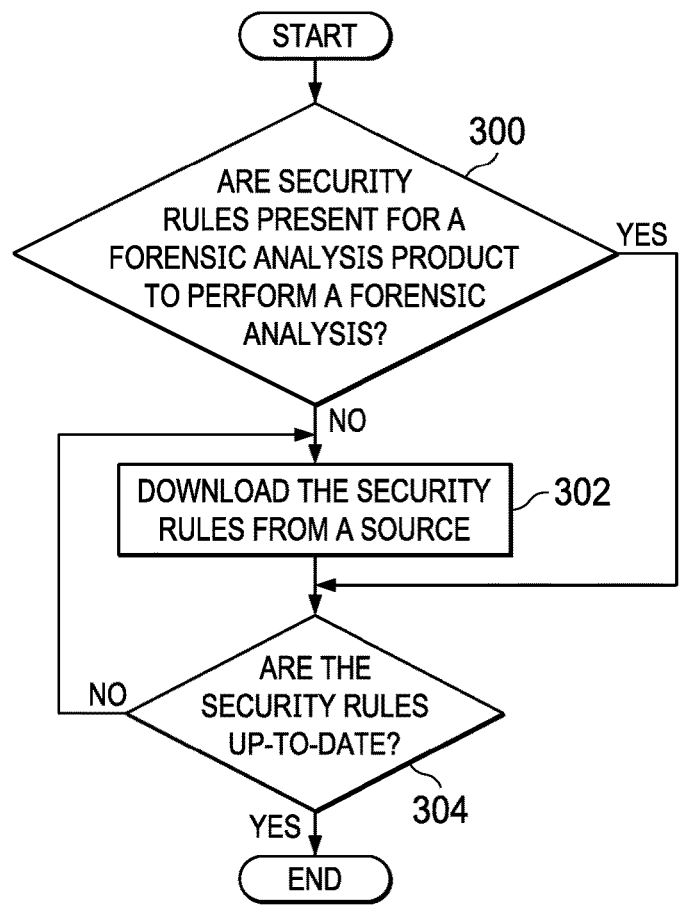
FIG. 3 is a flowchart of a process for accessing a set of security rules for use in analyzing past user sessions for malicious intent in accordance with an illustrative embodiment.

With reference to FIG. 3, a flowchart of a process for accessing a set of security rules for use in analyzing past user sessions for malicious intent is depicted in accordance with an illustrative embodiment. This process can be implemented in forensic analysis product 118 to obtain security rules that are for a dynamic analysis product to test for website vulnerability.

The process determines whether security rules are present for a forensic analysis product to perform a forensic analysis (step 300). If the security rules are not present, the process downloads the security rules from a source (step 302). The source can be a dynamic analysis product, a server, or a rule source that is configured to supply the security rules to a dynamic analysis product and the forensic analysis product.

The process then determines whether the security rules are up-to-date (step 304). This determination can be made in a number of different ways. For example, the process can contact the source of the security rules to determine whether updated security rules are present. If the rules are up-to-date, the process terminates.

With reference again to step 300, if the security rules are present, the process proceeds to step 304. Turning back to step 304, if the security rules are not up-to-date, the process proceeds to step 302. This process can be repeated any number of times to obtain updated security rules.

The process in FIG. 3 illustrates one manner in which security rules can be obtained by forensic analysis product 118. In another illustrative example, security rules can be updated for forensic analysis product 118 each time dynamic analysis product 124 receives new or updated security rules. This type of update can be performed as a push by dynamic analysis product 124.

Figure 4:
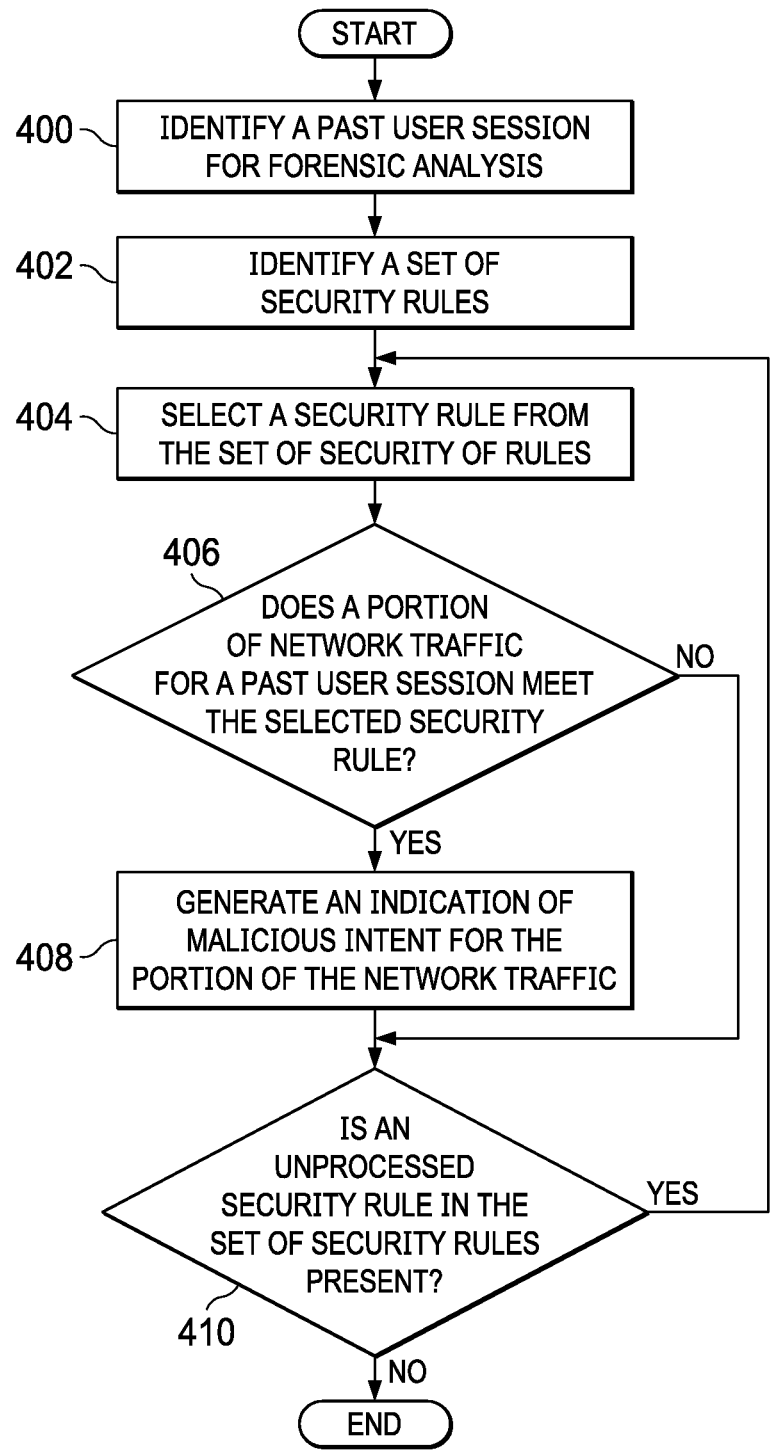
FIG. 4 is a flowchart of process for performing a forensic analysis of past user sessions using a set of rules for a dynamic analysis product in accordance with an illustrative embodiment.

With reference next to FIG. 4, a flowchart of process for performing a forensic analysis of past user sessions using a set of rules for a dynamic analysis product is depicted in accordance with an illustrative embodiment. The process illustrated in this figure can be implemented in session analyzer 112.

The process begins by identifying a past user session for forensic analysis (step 400). This past user session can be located in a database or other data store. The past user session comprises user session data such as network traffic that occurred during the past user session.

The process identifies a set of security rules (step 402). In step 402, the set of security rules are rules for a dynamic analysis product to detect website or other web-related vulnerabilities. In the illustrative example, these security rules are used to determine whether one or more actions in a past user session for a user are considered to be malicious.

The process selects a security rule from the set of security of rules (step 404). A determination is made as to whether a portion of network traffic for a past user session meets the selected security rule (step 406). When the security rule is used by a dynamic analysis product, the security rule is to perform a test in which actions are performed similar to actions that will be performed by user with malicious intent. In this example, the security rule defines the pattern of network traffic that is considered to be malicious. In other words, the security rule can be used to determine whether a portion of the network traffic for the current user resembles malicious activity based on the network traffic indicating malicious activity as defined by the security rule. The security rule does not need to be modified from the form as used by a dynamic analysis product, but is used for a different purpose in step 406. For example, the security rule can define a pattern of requests and responses that would indicate an attempt to infiltrate or take advantage of a vulnerability in a website or other web-related resource. In another example, a security rule may be used to determine whether the server response in the portion of the network traffic contains personally identifiable information or other data that the user should not be able to access. In this illustrative example, personally identifiable information may include, for example, a table of usernames and passwords, credit card information, or other information that the user should not have access to.

If a portion of the network traffic meets this selected security rule, the process generates an indication of malicious intent for the portion of the network traffic (step 408). For example, if the network traffic contains personally identifiable information or other data that the user should not access, the indication of the malicious intent indicates that data exfiltration has occurred. In other words, the indication may indicate that an unauthorized transfer of data is present in that portion of the network traffic. The indication may be an entry placed into a log or in some other data structure for the past user session being analyzed for malicious intent.

The process then determines whether an unprocessed security rule in the set of security rules is present (step 410). If an unprocessed security rule is present, the process returns to step 404 to select another security rule for processing with respect to the network traffic in the past user session. Otherwise, the process terminates.

With reference again to step 406, if the portion of the network traffic for the past user session does not meet the selected security rule, the process proceeds to step 410 as described above. This process in FIG. 4 can be repeated any number of times for different past user sessions to analyze those past user sessions for the presence of malicious intent in the actions performed by users for those past user sessions.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, security rules 120 for dynamic analysis product 124 has been described as rules use to test a website. These security rules can be used by session analyzer 112 to analyze past user sessions 106 or network traffic 108 with respect to websites. Additionally, security rules 120 can also be used to analyze network traffic 108 for malicious activity with respect to other types of web resources. For example, security rules 120 can be used to analyze network traffic 108 for malicious activity that may be directed to a web service, a proxy server, or some other resource available on network 114. Further, in other illustrative examples, security rules 120 for dynamic analysis product 124 also may be directed towards other types of web resources other than websites.

Figure 5:
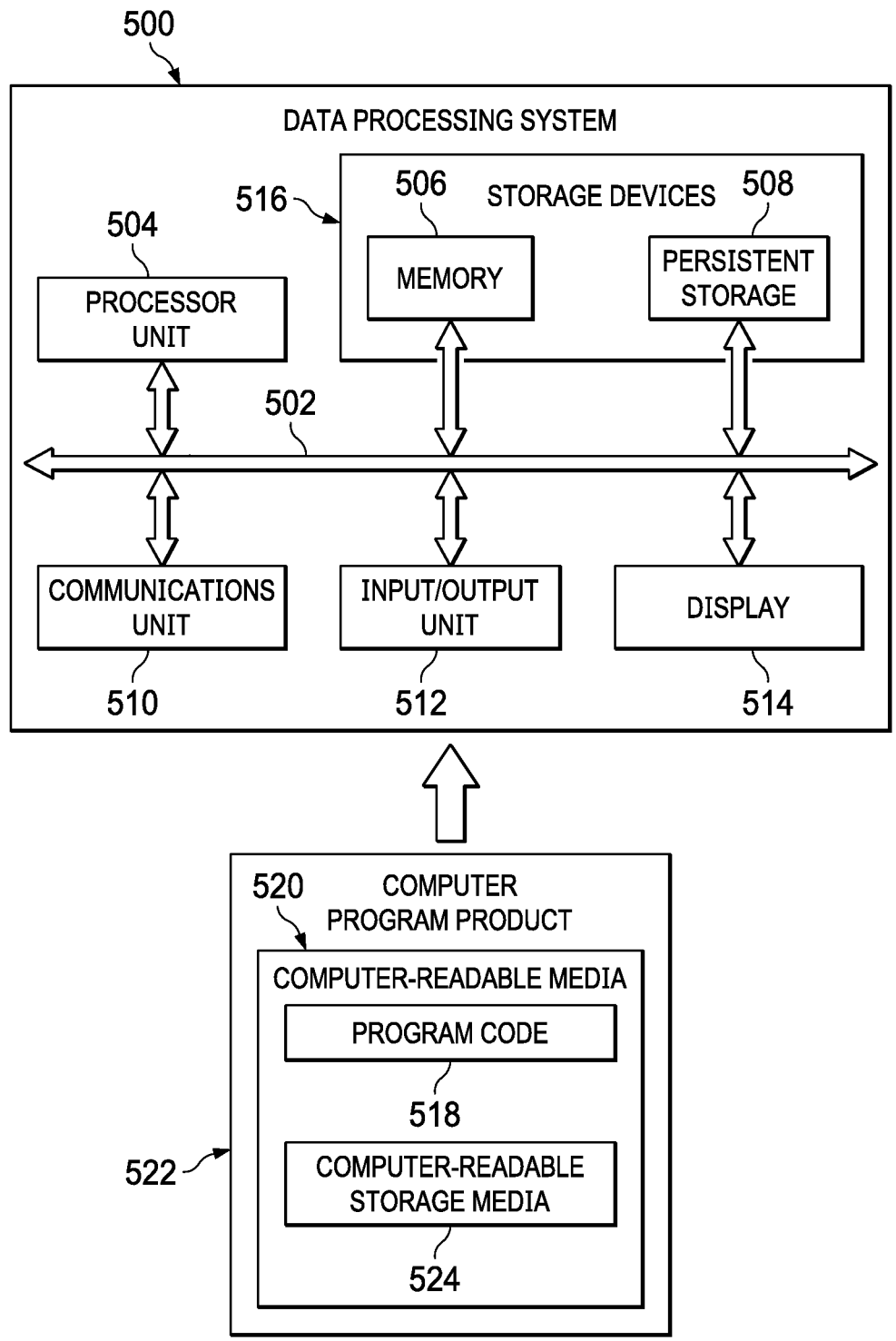
FIG. 5 is a block diagram of a data processing system in accordance with an illustrative embodiment.

Turning now to FIG. 5, a block diagram of a data processing system is depicted in accordance with an illustrative embodiment. Data processing system 500 may be used to implement one or more computers in computer system 126 or other data processing systems in network 114 in FIG. 1. In this illustrative example, data processing system 500 includes communications framework 502, which provides communications between processor unit 504, memory 506, persistent storage 508, communications unit 510, input/output (I/O) unit 512, and display 514. In this example, communications framework 502 may take the form of a bus system.

Processor unit 504 serves to execute instructions for software that may be loaded into memory 506. Processor unit 504 may be a number of processors, a multi-processor core, or some other type of processor, depending on the particular implementation.

Memory 506 and persistent storage 508 are examples of storage devices 516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 516 may also be referred to as computer-readable storage devices in these illustrative examples. Memory 506, in these examples, may be, for example, a random-access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a solid state hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these illustrative examples, provides for communications with other data processing systems or devices. In these illustrative examples, communications unit 510 is a network interface card. Input/output unit 512 allows for input and output of data with other devices that may be connected to data processing system 500. For example, input/output unit 512 may provide a connection for user input through at least one of a keyboard, a mouse, or some other suitable input device. Further, input/output unit 512 may send output to a printer. Display 514 provides a mechanism to display information to a user.

Instructions for at least one of the operating system, applications, or programs may be located in storage devices 516, which are in communication with processor unit 504 through communications framework 502. The processes of the different embodiments may be performed by processor unit 504 using computer-implemented instructions, which may be located in a memory, such as memory 506.

These instructions are referred to as program code, computer usable program code, or computer-readable program code that may be read and executed by a processor in processor unit 504. The program code in the different embodiments may be embodied on different physical or computer-readable storage media, such as memory 506 or persistent storage 508.

Program code 518 is located in a functional form on computer-readable media 520 that is selectively removable and may be loaded onto or transferred to data processing system 500 for execution by processor unit 504. Program code 518 and computer-readable media 520 form computer program product 522 in these illustrative examples. In the illustrative example, computer-readable media 520 is computer-readable storage media 524. In these illustrative examples, computer-readable storage media 524 is a physical or tangible storage device used to store program code 518 rather than a medium that propagates or transmits program code 518.

Alternatively, program code 518 may be transferred to data processing system 500 using a computer-readable signal media. The computer-readable signal media may be, for example, a propagated data signal containing program code 518. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code 518.

Thus, illustrative embodiments of the present invention provide a computer-implemented method, a computer system, and a computer program product for detecting actions by users that are malicious. The illustrative embodiments can be utilized to analyze past user sessions per malicious intent. As depicted in the different illustrative examples, a forensic analysis product can be created or modified that utilizes security rules for a dynamic analysis product to perform a forensic analysis of past user sessions.

In some illustrative examples, the forensic analysis product and the dynamic analysis product can be configured to communicate with each other. In this manner, the set of security rules for the dynamic analysis product may accessed by the forensic analysis product to analyze past user sessions. The forensic analysis product can download the set of security rules from the dynamic analysis product. This downloading is performed as an automatic update depending on the particular implementation.

As described above, security incidents can be detected by a detector such as an intrusion protection system, an intrusion detection system, a security information and event management system, or some other suitable type of detection system. The detection is for a user session for a current user. The detection can be used to start a forensic investigation of the past user sessions for a current user by the forensic analysis product utilizing security rules. Further, the forensic analysis may use past user sessions even if a security incident is not detected. When malicious intent is identified in network traffic of the past user sessions, one or more other security incidents are identified from the past user sessions. These other security incidents can be sent to one or more detectors. The security incidents can provide information utilized to increase the accuracy in which the detectors detect or protect systems from users with malicious intent.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for analyzing past user sessions for malicious intent, the method comprising:
    detecting, by a computer system, a security incident;
    responsive to detecting the security incident, triggering, by the computer system, a forensic investigation using a set of security rules for detecting website vulnerability in which the set of security rules is applied to a set of past user sessions, wherein the set of security rules is for a dynamic analysis product;
    downloading a database of the set of security rules associated with the dynamic analysis product for use by a forensic analysis product to perform the forensic investigation; and
    configuring the dynamic analysis product, comprising a set of security tests for detecting the website vulnerability using the set of security rules, and the forensic analysis product, configured to analyze patterns of network traffic using the set of security rules to investigate security incidents in the forensic investigation, to communicate with each other.

2. The method of claim 1, wherein triggering the forensic investigation using the set of security rules for detecting the web site vulnerability comprises:
    identifying a set of past user sessions for a current user identified in the security incident; and
    applying the set of security rules to the set of past user sessions for the current user to identify a group of other security incidents associated with the current user.

3. The method of claim 2, wherein applying the set of security rules to the set of past user session to identify the group of other security incidents associated with the current user comprises:

applying the set of security rules to patterns of network traffic for the set of past user sessions for the current user to identify the group of other security incidents associated with the current user.

4. The method of claim 2, wherein applying the set of security rules to the set of past user sessions to identify the group of other security incidents associated with the current user comprises:

applying the set of security rules to patterns of network traffic to a past user session in the set of past user sessions for the current user to determine whether a pattern of network traffic in the patterns of network traffic matches a security rule in the set of security rules to identify the group of other security incidents associated with the current user.

5. The method of claim 1, wherein detecting the security incident comprises:

detecting the security incident using at least one of an intrusion protection system, an intrusion detection system, or a security information and event management system.

6. The method of claim 1 further comprising:

identifying the set of past user sessions in a database; and performing the forensic investigation on the set of past user sessions using the set of security rules for detecting the web site vulnerability in which the set of security rules is applied to the set of past user sessions.

7. The method of claim 1 wherein the forensic analysis product uses the set of security rules to identify cookies and parameters in network traffic following a same logic that the dynamic analysis product employs to dynamically detect vulnerabilities in the network traffic.

8. A computer system comprising:

a processor unit; and a forensic analysis product running on the processor unit, wherein the forensic analysis product, responsive to detecting a security incident, triggering a forensic investigation using a set of security rules for detecting web site vulnerability in which the set of security rules is applied to a set of past user sessions, wherein the set of security rules is for a dynamic analysis product, wherein the forensic analysis product downloads a database of security rules associated with the dynamic analysis product for use by the forensic analysis product to perform the forensic investigation, and wherein the forensic analysis product communicates with the dynamic analysis product, comprising the set of security rules for detecting the website vulnerability, to receive the set of security rules associated with the dynamic analysis product.

9. The computer system of claim 8, wherein the forensic analysis product triggers the forensic investigation using the set of security rules for detecting the website vulnerability by identifying the set of past user sessions for a current user identified in the security incident and applying the set of security rules to the set of past user sessions for the current user to identify other security incidents associated with the current user.

10. The computer system of claim 9, wherein the forensic analysis product applies the set of security rules to the set of past user session to identify a group of the other security incidents associated with the current user by applying the set of security rules to patterns of network traffic for the set of past user sessions for the current user to identify the group of the other security incidents associated with the current user.

11. The computer system of claim 9, wherein the forensic analysis product applies the set of security rules to a current user session to identify the group of the other security incidents associated with the current user comprises:

applying the set of security rules to patterns of network traffic for a past user session for the current user to determine whether a pattern of network traffic in the patterns of network traffic matches a security rule in the set of security rules to identify the group of the other security incidents associated with the current user.

12. The computer system of claim 8, wherein the forensic analysis product detects the security incident by receiving an indication from at least one of an intrusion protection system, an intrusion detection system, or a security information and event management system.

13. The computer system of claim 8, wherein the forensic analysis product identifies the set of past user sessions in a database and performs the forensic investigation on the set of past user sessions using the set of security rules for detecting the website vulnerability in which the set of security rules is applied to the set of past user sessions.

14. The computer system of claim 8, wherein the forensic analysis product uses the set of security rules to identify cookies and parameters in network traffic following a same logic that the dynamic analysis product employs to dynamically detect vulnerabilities in the network traffic.

15. A computer program product for analyzing user sessions for malicious intent, the computer program product comprising:

a computer-readable storage media;

first program code, stored on the computer-readable storage media, for detecting a security incident;

second program code, stored on the computer-readable storage media, for triggering a forensic investigation using a set of security rules for detecting website vulnerability in response to detecting the security incident, in which the set of security rules is applied to a set of past user sessions, wherein the set of security rules is for a dynamic analysis product; and third program code, stored on the computer-readable storage media, for downloading a database of the set of security rules associated with the dynamic analysis product for use by a forensic analysis product to perform the forensic investigation, wherein the forensic analysis product communicates with the dynamic analysis product, comprising the set of security rules for detecting the website vulnerability, to receive the set of security rules associated with the dynamic analysis product.

16. The computer program product of claim 15, wherein the second program code comprises:

program code, stored on the computer-readable storage media, for identifying the set of past user sessions for a current user identified in the security incident; and program code, stored on the computer-readable storage media, for applying the set of security rules to the set of past user sessions for the current user to identify other security incidents associated with the current user.

17. The computer program product of claim 16, wherein the program code for applying the set of security rules to the set of past user sessions to identify the other security incidents associated with the current user comprises:

program code, stored on the computer-readable storage media, for applying the set of security rules to patterns of network traffic for the set of past user sessions for the current user to identify a group of the other security incidents associated with the current user.

18. The computer program product of claim 16, wherein the program code for applying the set of security rules to the set of past user sessions for the current user to identify the other security incidents associated with the current user comprises:

program code, stored on the computer-readable storage media, for applying the set of security rules to patterns of network traffic to a past user session in the set of past user sessions for the current user to determine whether a pattern of network traffic in the patterns of network traffic matches a security rule in the set of security rules to identify a group of the other security incidents associated with the current user.

\* \* \* \* \*